W. Clissold,
Wool Oiling Machine.

No. 2,213. Reissued Mar. 27, 1866.

Witnesses.
Thos. R. Roach
P. B. Fachenacker.

Inventor.
Wm. Clissold
by his attorney
Sam. Cooper

N. PETERS, PHOTO-LITHOGRAPHER, WASHINGTON, D. C.

UNITED STATES PATENT OFFICE.

GEORGE S. HARWOOD AND GEORGE H. QUINCY, OF BOSTON, MASSACHUSETTS, ASSIGNEES OF WILLIAM CLISSOLD.

IMPROVEMENT IN MACHINES FOR OILING WOOL.

Specification forming part of Letters Patent No. 36,603, dated February 24, 1862; antedated February 24, 1862.; Reissue No. 1,764, dated September 13, 1864; Reissue No. 2,213, dated March 27, 1866.

*To all whom it may concern:*

Be it known that WILLIAM CLISSOLD, of Dudbridge Works, Stroud, in the county of Gloucester, in that part of the United Kingdom of Great Britain and Ireland known as England, patent-machine manufacturer, did invent certain Improvements in Oiling Wool; and we do hereby declare that the following is a full, clear, and exact description of the said invention.

This invention relates to the operation of supplying oil or oleaginous mixtures to wool preparatory to its being submitted to the carding-engine and while being fed thereto for the purpose of being worked into sliver, the object of this invention being to effect a uniform and equable distribution of the liquid through the mass of fibers under operation, and prevent the waste of oil, labor, and time that is consequent on the mode of oiling wool heretofore practiced. To this end a pressure-roller is used, mounted above the feed-apron of a carding-engine, to which the wool is supplied in the usual manner. This pressure-roller receiving oil from a suitable reservoir through the intermediary of a traveling brush or brushes, and dipping plate or plates, which supply the brush or brushes with the requisite quantity of oil, will insure the equable distribution of the oil over the whole surface of the wool as it is passed under it and in contact therewith. The dipper is arranged to perform two functions—first, continually stirring up or mixing the oil or composition, and, second, carrying or lifting up the requisite quantity of oil for each individual oiling operation. Without this stirring up it would be impossible to use a composition, or even common oil. The one separates—the other settles with a heavy sediment.

Figure 2:
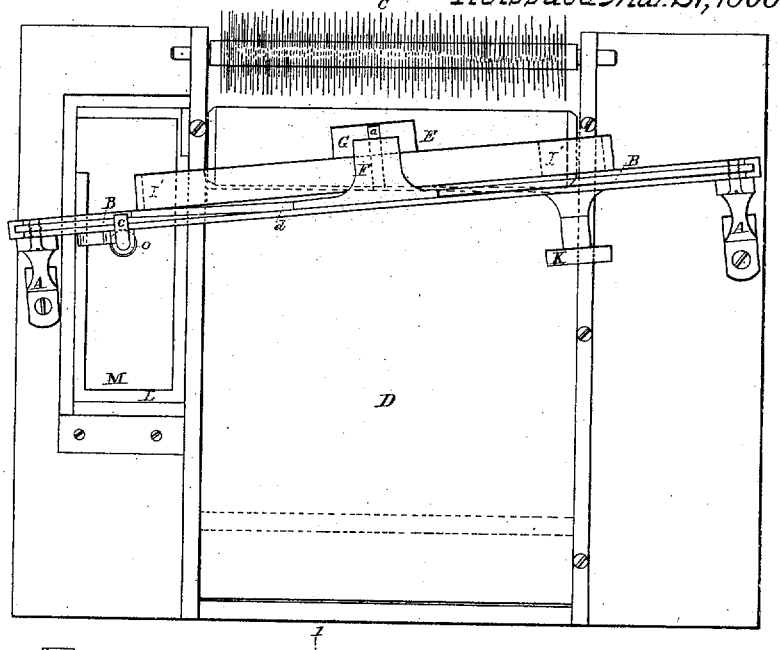
Figure 1:
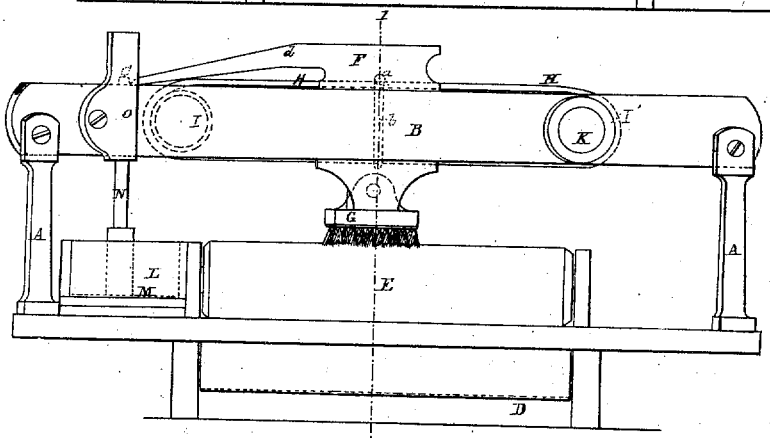
Figure 3:
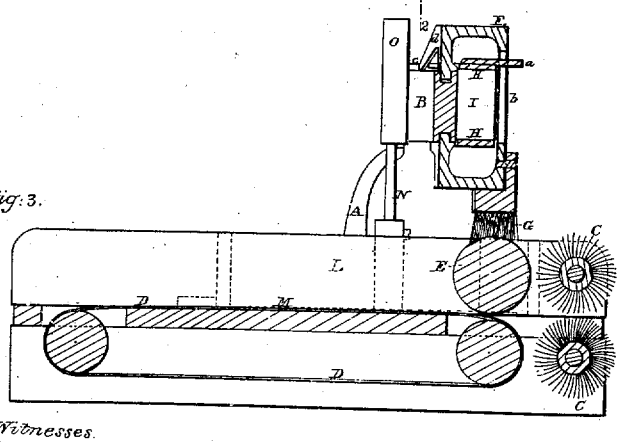

In the accompanying drawings, Figure 1 represents in front elevation the improved oiling apparatus as applied to a carding-engine. Fig. 2 is a plan view of the same, and Fig. 3 is a vertical cross-section on the line 1 2 of Fig. 1.

A A are two standards which support a horizontal cross-bar, B, set in advance of the feed-rollers C C of the carding-engine. This bar stretches across the feed-apron D of the engine, and is set at an angle to the feed-rolls. Below this bar (and revolving in contact with the wool placed on the feed-apron) is a metal roller, E, which has its bearings in the side framing of the engine, and is intended to distribute oil to the wool. The bar B forms a rail for the traverse of a carriage, F, which carries a brush, G, by which it is intended to transmit the oleaginous mixture to the oil-distributing roller E.

H is a belt passing over the drums or pulleys I I′, having their bearings in the cross-bar B. The driving-wheel K is placed on the shaft which carries the drum I′. A continuous rotary motion is by this arrangement communicated from the driving-wheel to the endless belt H.

The traverse of the brush-carriage is effected by means of a pin, *a*, fastened to the outside face of the endless belt moving in a slot, *b*, in the back of the carriage F.

We will now describe the manner of supplying the brush with oil. At one side of the engine, and immediately below the pulley I, is a reservoir, L, for containing the oleaginous mixture, and into this reservoir dips a plate, M, which is carried by a rod, N, that slides freely in a guide, O, provided for it on the face of the bar B, and is adjusted vertically upon that rod. The upper end of the rod N terminates in a bent arm, *c*, which projects over the top edge of the bar B, and is raised or lowered by an incline, *d*, attached to the top of the carriage F. As the carriage comes to the end of its traverse, the incline *d* will pass under the bent arm *c* of the rod N, and cause it to rise with the rod until the dipping plate M has moved out of the oil mixture and brought up a determinate quantity upon its upper surface. The carriage F, in completing its traverse, will carry the brush over this plate and cause it to take up a charge of oil therefrom. The carriage will then return, and, passing diagonally over the rotating roller E, will lay a thin film of oil over the upper surface of the roller, a fresh surface being constantly presented to the traversing-brush. By a continuous repetition of this action the whole periphery of the roller will be evenly and uniformly oiled, and as the roller revolves it will press the oil into the wool that is being fed to the carding engines in regulated quantities, as is well understood.

The friction between the traveling wool and the lower part of the roller will be sufficient to secure a regular axial motion thereto.

If found desirable, an oil-reservoir and dipping plate may be provided at both sides of the machine. In such case a double wedge will be required on the brush-carriage to operate alternately on the two dipping-plate rods. When two brushes are used, they are connected directly to the endless belt.

As the action of the dipping plate is to plunge into and rise quickly out of the oiling-liquid, it will impart to that liquid the requisite agitation for maintaining the intimate admixtures of the ingredients.

Having now set forth the nature of the said invention and the manner in which the same is or may be performed, what we claim as the invention of the said WILLIAM CLISSOLD is—

1. The oiling or lubricating of wool or other fibrous material by means of a pressure-roller imprinting and diffusing the oil or lubricating-mixture, which shall have been supplied in requisite quantity to the roller, in the manner substantially as set forth.

2. A machine or apparatus for oiling wool, consisting of the following elements combined: first, one or more reservoirs for containing the oil or oleaginous mixture; second, a dipper or dippers and a brush or brushes, the former to convey and the latter to receive the determinate and requisite quantity of oil or oleaginous mixture; third, a distributer or distributers receiving oil or oleaginous mixture from the brush or brushes and transferring it to the wool, substantially as set forth.

3. In automatic wool-oiling machinery, the combination of a tank or reservoir with a dipper or equivalent mechanism for performing the double function of stirring or agitating the oil or lubricating-matter in the tank, and of lifting therefrom at each action a quantity of oil or lubricating-matter requisite for one oiling operation and this is claimed only when arranged for operation as described—that is to say, so that the said dipper shall not come in contact with the wool—substantially as set forth.

4. In automatic wool-oiling machinery, combining with an oil-tank a dipper constructed substantially as described, for the more perfect agitation of the liquid, substantially as set forth.

5. In automatic wool oiling machinery, the combination of an oil-tank with a dipper constructed substantially as described, so that the requisite quantity of oil for each operation shall be lifted and conveyed from the tank by adhesion of the oil or lubricating-matter to the dipper, substantially as set forth.

6. The combination, with an oil-reservoir and intermediate dipper and brush or other equivalent device for conveying oil in requisite quantities to the distributer, of a pressure-roller arranged immediately in front of the feed-rollers above the feed-apron of carding or other wool-preparing machinery, substantially as set forth.

7. In a wool-oiling apparatus in which the wool is oiled by imprinting the oil, as described, in combination with a pressure-roller or the equivalent thereof, a brush or brushes charged with oil by means of one or more dipping plates, substantially as set forth.

8. The combination, with one or more oil-reservoirs and traveling brush or brushes, of a plate or plates for charging the said brush or brushes with the requisite amount of oil, and when arranged for action so as to properly agitate the oil or oleaginous mixture, substantially as set forth.

9. In combination with a distributing pressure-roller, a brush traveling diagonally over the said roller—that is to say, at an angle with the axis of, but in a plane tangent, to the roller—substantially as and for the purposes set forth.

In testimony whereof we have signed our names to this specification before two subscribing witnesses.

GEORGE S. HARWOOD.
GEORGE H. QUINCY.

Witnesses:
GEO. A. DARY,
GEO. T. ANGELL.